United States Patent
Lackner

[11] Patent Number: 5,901,665
[45] Date of Patent: Apr. 27, 1999

[54] CAGE BATTERY FOR POULTRY KEEPING

[75] Inventor: Karl Horst Lackner, Ittlingen, Germany

[73] Assignee: Salmet Gesellschaft mit beschrankter Haftung & Co. Kommanditgesellschaft, Ittlingen, Germany

[21] Appl. No.: 08/703,073

[22] Filed: Aug. 26, 1996

[30] Foreign Application Priority Data

Aug. 26, 1995 [DE] Germany .............................. 195 31 501

[51] Int. Cl.$^6$ ...................................................... A01K 31/06
[52] U.S. Cl. ........................................... 119/458; 119/479
[58] Field of Search .................................. 119/458, 455, 119/442, 443, 479

[56] References Cited

U.S. PATENT DOCUMENTS

| | | | |
|---|---|---|---|
| 3,396,702 | 8/1968 | Trussell | 119/455 |
| 4,242,809 | 1/1981 | Elder | 119/458 |
| 5,007,379 | 4/1991 | Lackner | 119/455 |

FOREIGN PATENT DOCUMENTS

| | | | |
|---|---|---|---|
| 3715735 | 11/1988 | Germany | A01K 31/00 |
| 3908336 | 9/1990 | Germany | A01K 31/01 |
| WO 93/23992 | 12/1993 | WIPO | 119/455 |

*Primary Examiner*—Edgar Burr
*Assistant Examiner*—Leslie Grohusky
*Attorney, Agent, or Firm*—Antonelli, Terry, Stout & Kraus, LLP

[57] ABSTRACT

The invention is an improved cage assembly for tending poultry. The cage assembly includes at least two horizontal cage rows formed by adjacent cage housings, a majority of the cage housings being formed by double cages, a dung receiver extending under each of the cage rows, fan flaps provided for drying collected dung, the fan flaps being distributed at longitudinal intervals along a dung receiver and above the dung receiver and mounted on transverse axes, pivot drives associated with the fan flaps to pivot the fan flaps, the pivot drives having push rods and pull rods extending in the lengthwise direction along the dung receiver through the cage assembly at a distance from the transverse axes of fan flaps and engaging the transverse axis, and with the fan flaps having force-transmitting part and a fan part.

20 Claims, 5 Drawing Sheets

CAGE BATTERY FOR POULTRY KEEPING

BACKGROUND OF THE INVENTION

1. Field of the Invention

The invention relates to a cage assembly for tending poultry.

2. Description of the Prior Art

A cage assembly for poultry tending including a device for drying dung collected by a dung belt is disclosed in DE 3715735C2.

With cage assemblies for tending poultry having great length inertial forces on pivot drives result which cause changes in the lengths of pull rods and push rods. These changes are of different magnitudes and sometimes are of considerable degree and lead to irregular operation and considerable vibration of the entire system.

An improvement in this situation is offered by the drive described in EP 0387819A1 for an air flow device of a cage assembly for tending poultry. This device works with pulling elements, with at least one spring acting against the direction of the driving force being attached to the elements. This spring keeps the pulling element under suitable tensile stress even during backward movement, resulting in uniform lengthening of the pulling elements.

Wet cleaning must be used in a cage assembly because of the risk of salmonella. Therefore, contrary to instructions, the air flow device may be switched off during cleaning. This can result in undesired deposition of chicken dung, leading to considerable imbalances. These imbalances can become so great that the springs break.

SUMMARY OF THE INVENTION

The invention provides a cage assembly having low-vibration, which is economical to operate, and has secure operation in a cage assembly of considerable length, with low energy consumption and limited wear.

To achieve this objective, the invention utilizes pull and push rods which are drivable with respect to one another in a reciprocating fashion in a group using a common drive means. The pull and push rods are articulated to fan flaps by articulation means comprising rotational axes, and in a vicinity of the articulation means (fan drive axes) of the fan flaps, free spaces for movement (through openings) are provided for the each of the pullrods and push rods. The common drive means drives in common, the pull and push rods that engage the drive element on both sides. A connecting member is provided between the pull and push rods and each fan articulation means (fan drive axis). The connecting member is rotatable around its rotational axis.

As a result of the drive means jointly driving the pull and push rods engaging the drive means on both sides, it would be expected that inertial forces acting in opposite directions on either side of the drive means would considerably reduce the vibrations of the entire system. Surprisingly, however it has been found that this advantage is achieved especially in conjunction with a connecting member rotatable around the geometric rotational axis arranged in parallel to the transverse axis of the fan flap, of a fan articulation means (fan drive axis) designated the fan drive axis. The connecting member is located between the fan articulation means and the push rod and pull rod. Primarily, as a result of these elements, no undesired vibrations develop and provide a form of decoupling effect and damping occurs preventing such vibrations. As a result, wear is considerably reduced both on the drive side and in the vicinity of the bearings of the fan flaps with the result that service life and operating time is considerably extended.

Advantageously, the drive means is provided approximately in the longitudinal center of a row of cages, at least partially inside a cage housing. As a result, vibration can be reduced even further and otherwise necessary auxiliary devices for supporting and fastening the drive means can be eliminated by optimum utilization of space. In addition, this arrangement permits the use of a single continuous dung belt for each row of cages, so that an additional, expensive, dung belt drive is not required.

A pivot bearing that accepts force peaks and/or lateral forces can advantageously be provided between each drive means and the fan flap directly adjacent thereto.

The drive means may be formed by two cam plates located side by side and spaced apart by a small distance therebetween and mounted on a common drive axis, with two cam axes and a drive axis lying in a common plane. In addition, an articulation element (connecting rod) can be provided advantageously between each drive means and its associated push and pull rods with the articulation element advantageously having at least one damping element made with rubber and/or plastic. Advantageously, the articulation element (connecting rod) has at least one angle-adjusting element. In addition, a bearing and equalizing element can be provided between the articulation element and the push rods and pull rods with the bearing and equalizing element having at least one damping element made with rubber and/or plastic.

According to a further embodiment of the invention, fan flaps are formed primarily by an upper force-transmitting part and a lower flap part. In this way, the special mechanical-climatic conditions in the cage assembly can be taken into account.

Advantageously, at least the force-transmitting part has openings in the material to reduce oscillating weight thereof.

It is also advantageous for reinforcing longitudinal ribs to be provided in a vicinity of the force-transmitting part with the longitudinal ribs extending predominantly in a longitudinal direction of the fan flaps.

Advantageously, the force-transmitting part and the flap part are primarily of two different materials, with the force-transmitting part being advantageously a relatively rigid plastic, especially of fiberglass-reinforced polyamide 6.6 (PA 6.6) and/or flap part being a relatively flexible plastic, especially a thermoplastic elastomer (TPE).

These measures, both individually and in combination with one another, contribute to operation of the entire system that is low in both vibration and wear.

A cage assembly in accordance with the invention includes at least two horizontal cage rows formed by cage housings located adjacent to one another; a majority of the cage housings being formed by double cages; a dung receiver extending under each of the cage rows; fan flaps provided to dry collected dung, the fan flaps being distributed above the dung receiver at longitudinal intervals along the dung receiver and being mounted on transverse axes; pivot drives associated with the fan flaps to pivot the fan flaps; pivot drives having pull and push rods extending longitudinally along the dung receiver through the cage assembly at a distance from the transverse axes of fan flaps and engaging the fan flaps; the pull and push rods being drivable with respect to one another in a reciprocating fashion and together by a common drive means (means); the pull and push rods being articulated to fan flaps by means of the pivot drives and having a geometrical axis extending parallel to the transverse axes; proximate (in the region of) each pivot drive a motion space for a pull and push rod; the common drive means driving the pull and push rods which engage two sides of a drive means of the common drive means; and a connecting member provided between the pull and push rods and each pivot drive and the connecting member being rotatable around the geometrical axis of the pivot drive. The drive means is provided proximate (in the region of) to a longitudinal center of a cage row at least partially inside a cage housing. A pivot bearing is provided between the drive means and a fan flap adjacent the pivot bearing for receiving force peaks or lateral forces. The drive means is formed by two separated side by side cam plates each having an eccentric axis and being mounted on a common drive axis and having two eccentric axes and in a common plane. An articulation element is provided between each of pull and push rod and the drive means. The articulation element has at least one damping element made of rubber and/or plastic and has at least one angle-adjusting element. A bearing and adjusting element is provided between the articulation element and a pull and push rod, the articulation element having at least one damping element made of rubber and/or plastic.

A cage assembly in accordance with the invention includes at least two horizontal cage rows formed by adjacent cage housings; a majority of the cage housings being formed by double cages; a dung receiver extending under each of the cage rows; fan flaps provided for drying collected dung, the fan flaps being distributed at longitudinal intervals along a dung receiver and above the dung receiver and mounted on transverse axes; pivot drives associated with the fan flaps to pivot the fan flaps; the pivot drives having pull and push rods extending in the longitudinal direction along the dung receiver through the cage assembly at a distance from the transverse axes of the fan flaps and engaging the fan flaps; and the fan flaps having a force-transmitting part and a fan part. At least the force-transmitting part has zones of less material relative to adjacent zones (openings) to reduce oscillating weight. The reinforcing ribs are provided proximate (in the region of) to the force-transmitting part, the longitudinal ribs extending in a longitudinal direction along the fan flaps. The force transmitting part and the fan part are made from two different materials. The force-transmitting part is made of a rigid plastic and contains preferably, polyamide reinforced with fiberglass. The fan part is made a flexible plastic and preferably, is an elastomeric thermoplastic.

BRIEF DESCRIPTION OF THE DRAWINGS

Further details, advantages, features, and embodiments of the invention are described below in conjunction with the drawings in which.

DESCRIPTION OF THE PREFERRED EMBODIMENTS

Figure 1:
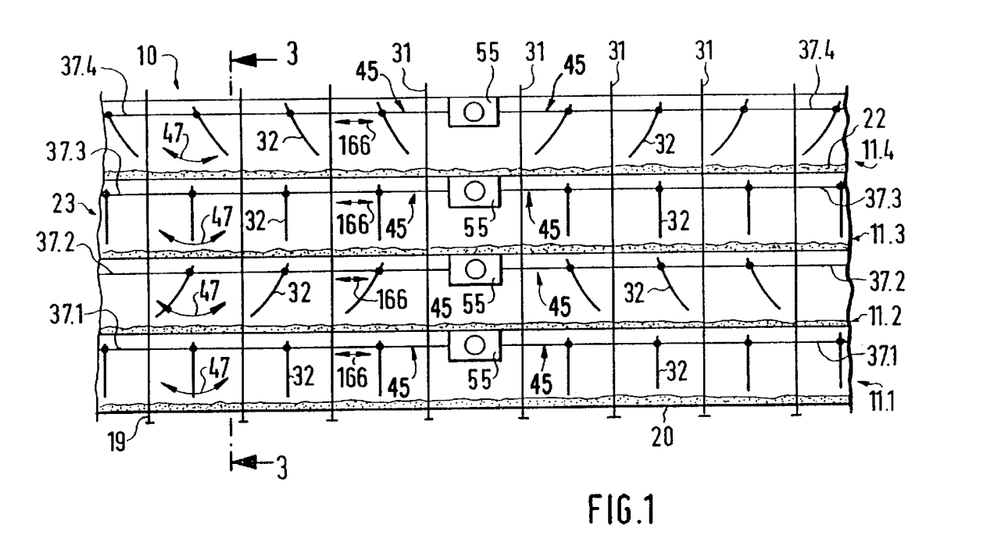
FIG. 1 is a schematic side view of a part of a cage.
Figure 2:
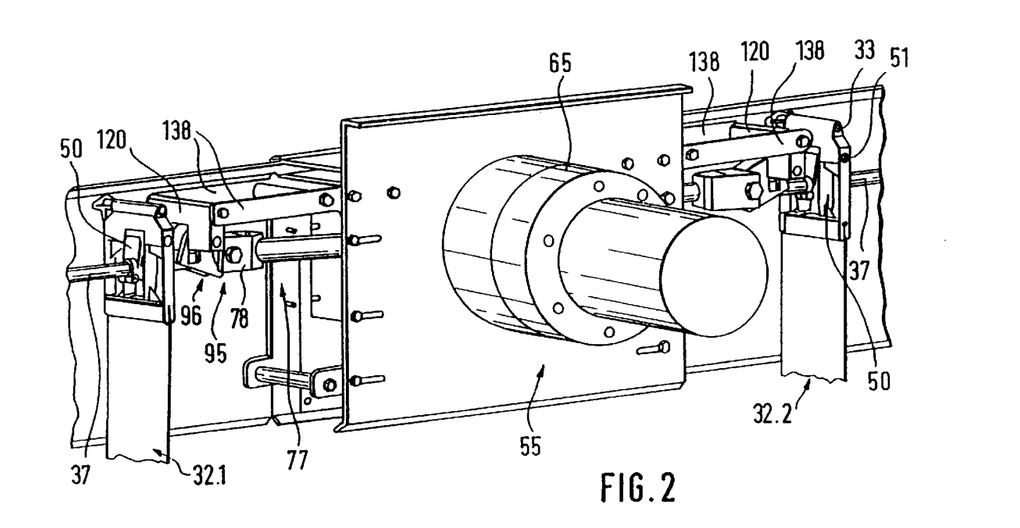
FIG. 2 is a partially schematic diagonal view of a part of the cage battery assembly in the vicinity of a drive means associated with a horizontal row of cages.
Figure 3:
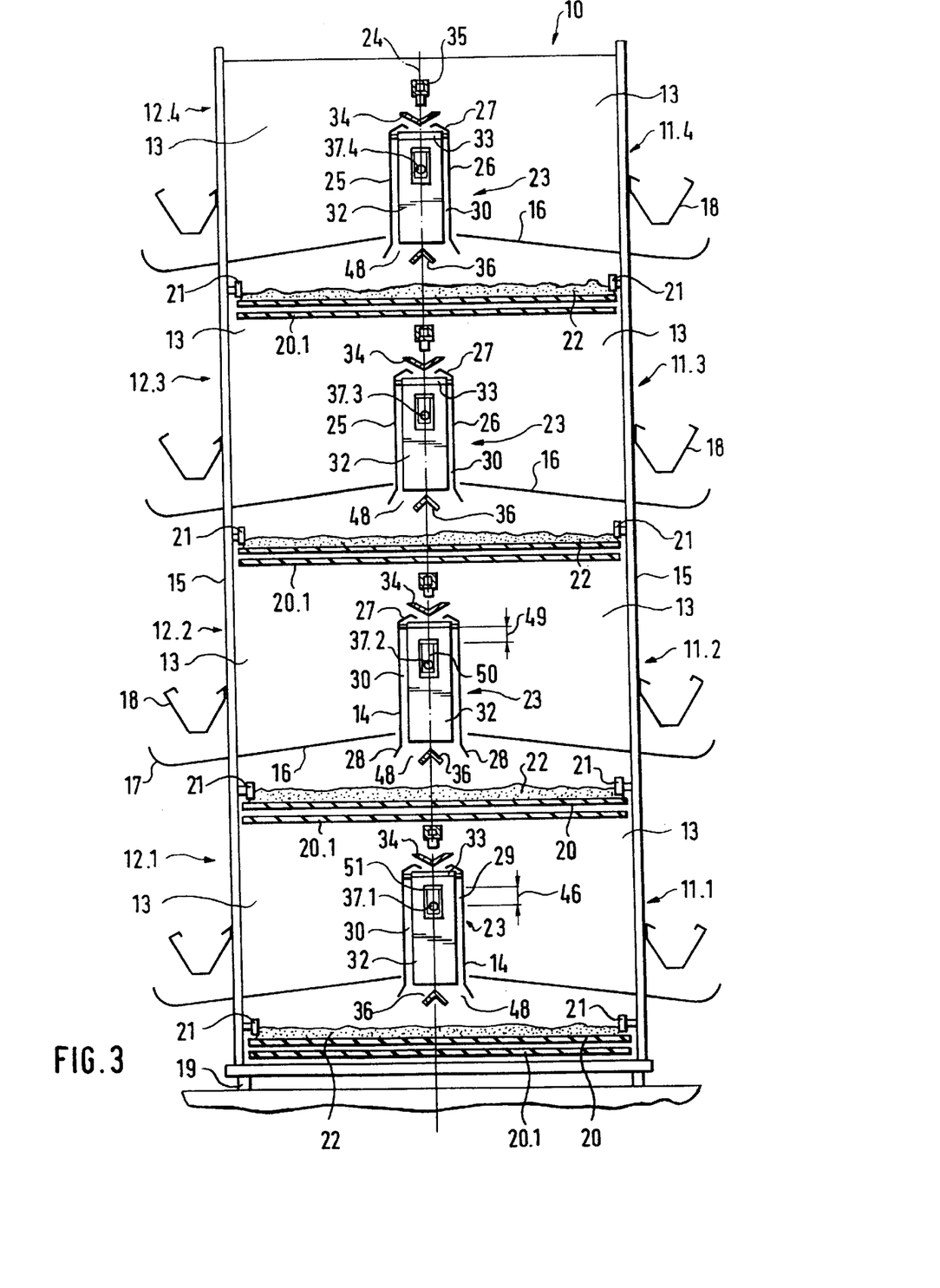
FIG. 3 is a schematic vertical section along line 3—3 in FIG. 1.

A cage assembly 10, as illustrated in FIGS. 1 and 3, has eight cage rows 11.1 to 11.4 that run horizontally. The rows are arranged on four levels one above the other. Thus, the two rows of cages in each level form a double cage row. Each double cage row has a plurality of cage housings 12.1 to 12.4 formed primarily by double cages 13, 13, with individual cages 13 abutting one another at the back in pairs. In the middle of each level of double cage rows, a drive means 55 illustrated in FIG. 2 for the pivot drive is provided, essentially inside a cage housing 12.1 to 12.4. To gain an advantage or to permit a combination of individual cage assemblies, however, drive means 55 can also be located outside cage housing 12.1 to 12.4. The pivot drives 45 for pivoting fan flaps 32 engage pull rods and push rods 37.1 to 37.4 on both sides of drive means 55. One fan flap 32 is associated with each double cage 13, 13. Each cage 13 is provided with a grid floor 16 that slopes from back 14 to front 15. The grid floor 16 projects beyond front 15 and forms an egg-collecting groove 17. Above this, a feed trough 18 is provided. The trough 18, like egg-collecting groove 17, extends over the entire length of double cage row and may also possibly be interrupted in the vicinity of the drive element. Cage assembly 10 is supported by feet 19 located in the vicinity of cage fronts between adjacent cages or cage housings in the bottom cage row 11.1. Cage assemblies can also have more than four levels and more than eight rows of cages. As a rule, they are many meters long, often 50 meters or more.

Each cage row has a dung receiver, a dung belt 20 for example, that extends at a distance below the opposite inclined grid floor 16 for the entire length of a level, but can be interrupted in the vicinity of drive means 55. At its two edges, edge limits 21 that project in the longitudinal direction and run through cage assembly 10 are provided at cage front 15. Dung belt 20 in the form of an endless circulating belt catches dung 22 that falls down through grid floor 16 and discharges it at its end from time to time. The loose return side of belt 20.1 is shown only schematically, without the deflecting rollers.

Each double cage row composed of double cages 13, 13 is provided with an air flow device 23. The air flow device 23, as shown in FIG. 3, is located essentially on both sides of a longitudinal central plane 24 of cage assembly 10 and between adjacent cages 13 that have their backs to one another. Air flow device 23 has two lengthwise walls 25 and 26 arranged essentially perpendicularly. The walls 25 and 26 extend parallel over the entire row of cages on opposite sides of lengthwise central plane 24. Upper edge strips 27 of the lengthwise walls 25 and 26 are bent inward toward lengthwise central plane 24, while lower edge strips 28 of lengthwise walls 25 and 26 are bent outward. Continuous lengthwise walls 25 and 26 each form a part of backs 14 of the cages 13. The walls 25 and 26 enclose a channel 29 that runs longitudinally. The channel 29 is divided into individual chambers 30 that have a narrow opening at their tops between edge strips 27 and are open at the bottom between edge strips 28. Channel 29 is divided into chambers 30 by transverse walls 31. The cross walls 31 simultaneously separating cages 13 that are adjacent to one another lengthwise. Accordingly, each double cage 13—13 is provided with an individual chamber 30, whose row extends in the lengthwise direction over the entire length of the cage.

In each chamber 30, with the exception of the chamber associated with drive means 55, a fan flap 32 is mounted by means of a transverse axis 33. The ends of the axis 33 are supported or mounted in at least one of the lengthwise walls 25 or 26, with fan flap 32 being separated from these walls by a small gap.

As indicated, the openings at the upper ends of chambers 30 are covered by a strip 34 running longitudinally. The strip 34 extends in the form of a groove beneath an elongated tube 35 and extends centrally longitudinally along plane 24 along the entire row of cages. In the vicinity of drive means 55, however, strip 34 can also be made uncovered or interrupted. At a short distance below suspended fan flaps 32, likewise in longitudinal central plane 24, and in the vicinity of the open lower end of chamber 30, an angular air flow divider 36 running longitudinally is associated with the chambers. As a result, two air outlet openings 48 are provided.

Figure 4:
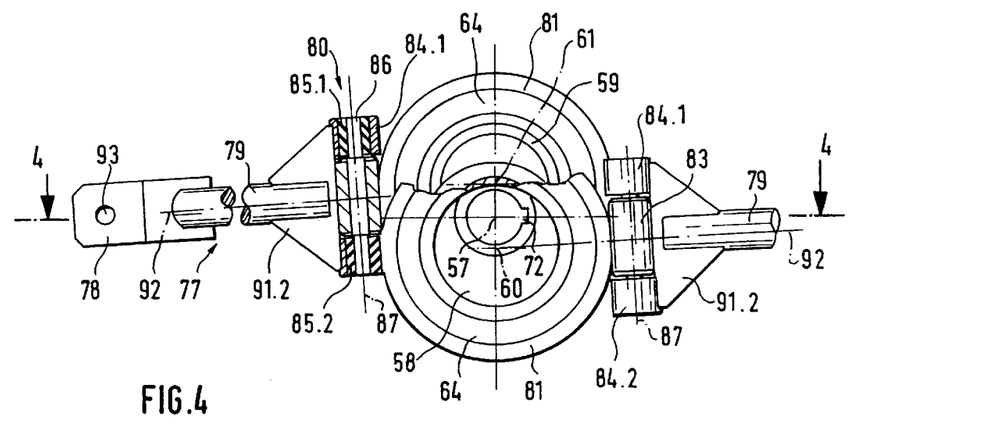
FIG. 4 is a side view with a partial section of an eccentric drive with the associated connecting rod.
Figure 5:
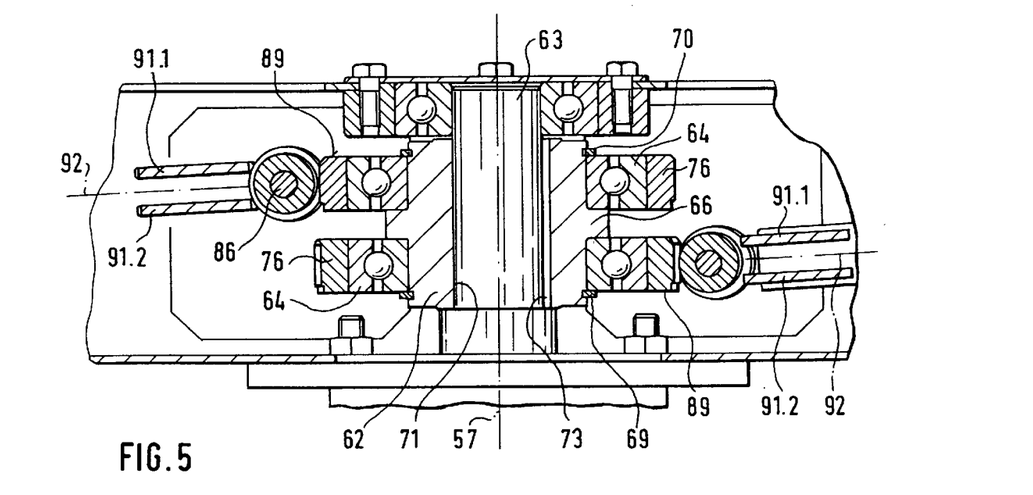
FIG. 5 is a horizontal section along line 4—4 in FIG. 4.

Drive means 55 is formed by two cam plates 58 and 59 as illustrated in FIG. 4 located side by side with a small space between them and located on common drive axis 57 of drive shaft 63 as illustrated in FIG. 5, with the two eccentric axes 60 and 61 and drive axis 57 lying in a common plane. Cam plates 58 and 59 are made in one piece, designed to form eccentric element 62, but can also be in the form of separate cam plates with a small space between them. Cam plates 58 and 59 each have a ball bearing 64, with the inside diameter of ball bearing 64 corresponding to the outside diameter of cam plates 58 and 59 in each case. Eccentric element 62 has a shoulder 66 whose axial exteriors are directed away from one another. Ball bearings 64 abut with their inner sides facing one another. Ball bearings 64, as shown in FIG. 5, are secured externally by shaft retaining rings 69 and 70 and are releasably mounted on eccentric element 62, but they can also be connected with eccentric element 62 in another fashion, especially by gluing. Eccentric element 62 has a hole 71 for releasably receiving drive shaft 63, with protection against rotation being provided by means of a wedge or feather key 73 engaging groove 72.

Drive shaft 63 is driven by drive motor 65, shown in FIG. 2, with a two-stage transmission, using, for example, an electric motor with a two-stage belt speed reduction or a single-stage belt reduction coupled to a transmission. Drive shaft 63 can also be other than driven, however.

Figure 6:
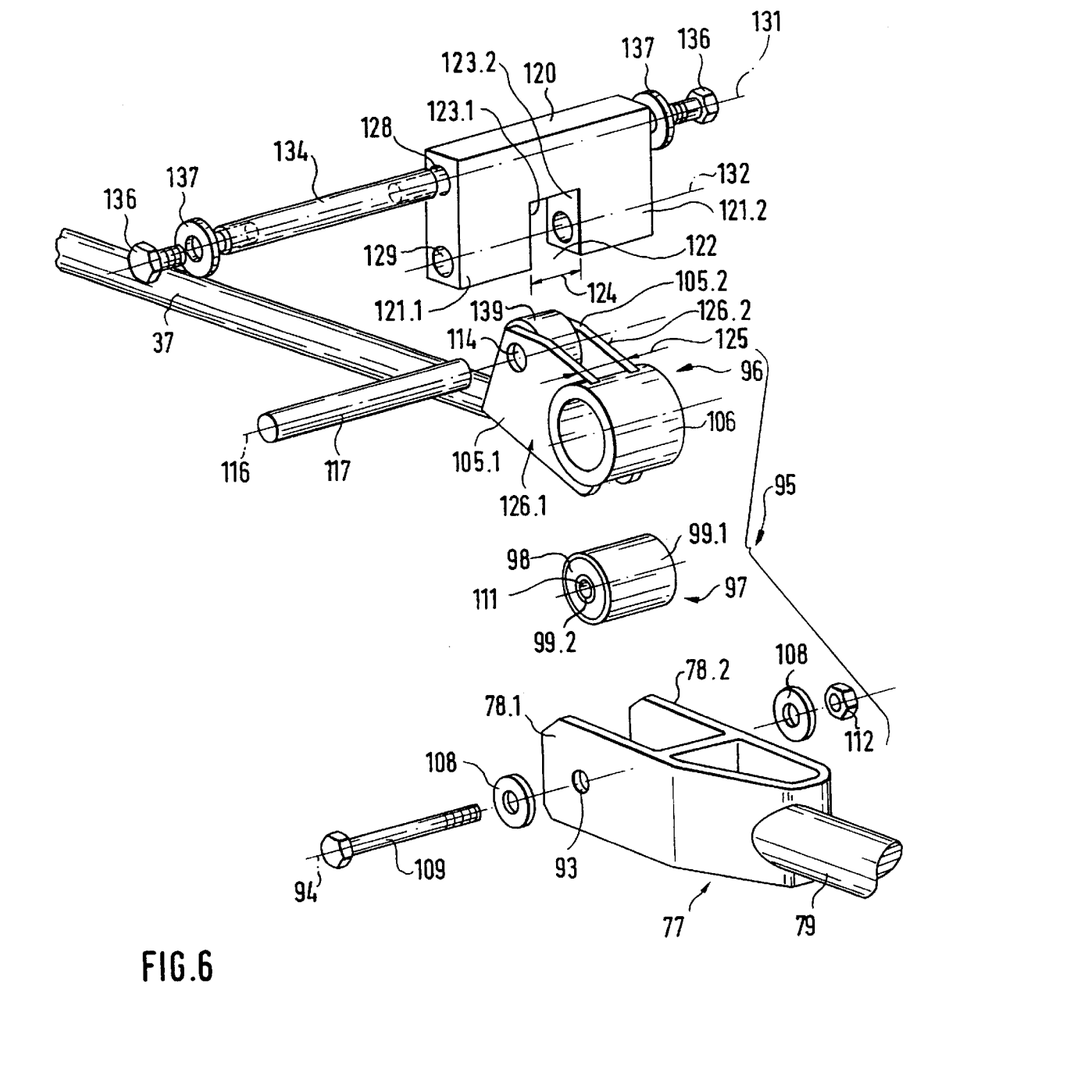
FIG. 6 is an exploded view of functional parts of the invention in a vicinity of the pivot bearing.

An articulating element, in this case connection rod 77 as illustrated in FIG. 4, is provided between pull rods and push rods 37 and drive means 55. Connecting rod 77 is formed by connecting rod fork 78, connecting rod shaft 79, angle compensating element 80, and connecting rod head 81. Angle compensating element 80 has bearing bushing 83, two articulation bushings 84.1 and 84.2, and damping elements 85.1 and 85.2 as well as bearing pins 86. Articulation bushings 84.1 and 84.2, bearing bushings 83, and damping members 85.1 and 85.2 are formed by hollow cylindrical sleeves. Articulation bushings 84.1 and 84.2 in the mounted state are each located at the ends of bearing bushing 83 and rest on bearing pins 86 by damping members 85.1 and 85.2. The bearing pins 86 extend through bearing bushing 83 as well as to the two damping members 85.1 and 85.2. Bearing bushing 83 is fastened to the surface associated with the outside diameter of connecting rod head 81, with articulation axis 87 running parallel to ends 89 of connecting rod head 81 being formed by a hollow cylindrical disk perpendicular to eccentric axes 60 and 61. A ring 76 of the connecting rod head 81 abuts ball bearing 64 whose outside diameter matches the inside diameter of connecting rod head 81. Articulation bushings 84.1 and 84.2 are fastened to respective connecting rod shafts 79 by two articulation strips 91.1 and 91.2. Their lengthwise axes 92 intersect eccentric axes 61 and 60 perpendicularly. Connecting rod fork 78 is fastened at the end of connecting rod shaft 79 directed away from connecting rod head 81. The fork 78 has two fork legs 78.1 and 78.2 as illustrated in FIG. 6 parallel to, and spaced apart from, one another. The two fork legs 78.1 and 78.2 are provided in the vicinity of the ends directed away from drive means 55 and each have a bore 93. Bores 93 lie on a common axis 94 parallel to drive axis 57.

A bearing and compensating element 95 is provided between pull rod and push rod 37 and connecting rod 77. This element is connected with the end of the push rod and pull rod 37 that is directed toward drive means 55 and bears bearing part 96 and damping member 97. Member 97 is designed exactly like damping members 85.1 and 85.2 with a sleeve 98 made with rubber and/or plastic that has sleeve-shaped metal jackets 99.1 and 99.2 on its inside and outside diameters. Bearing part 96 is formed by two parallel mounting legs 105.1 and 105.2 arranged on both sides of push rods and pull rods 37, with hollow cylindrical pivot bushing 106 being fastened to the ends of the legs that are directed toward drive means 55. Damping member 97 is mounted in the bushing 106. In the mounted state, bearing part 96 together with damping element 97 is fastened between the two fork legs 78.1 and 78.2 of connecting rod 77 by means of articulation screw 109, passed through bores 93 of connecting rod fork 78 and bore 111 of damping member 97, with two spacer washers 108 and hexagonal nut 112 screwed in place.

Mounting legs 105.1 and 105.2 of bearing part 96 are each provided with a bore 114. The bore 114 has a common rotational axis 116 that runs parallel to drive axis 57.

A pivot bearing 120 that accepts force peaks and/or lateral forces is provided between drive means 55 and fan flap 32.1 or 32.2 directly adjacent. Pivot bearing 120 is made plate-shaped and has pivot bearing legs 121.1 and 121.2 at each end. At the center of its length, pivot bearing 120 has a gap 122 that is rectangular in shape and open at the bottom. The gap 122 is defined laterally by the two parallel end faces 123.1 and 123.2 of pivot bearing legs 121.1 and 121.2 which face one another. Gap width 124 is slightly larger than space 125 between the two outwardly directed lateral faces 126.1 and 126.2 of mounting legs 105.1 and 105.2. In the vicinity of both the upper and lower ends of pivot bearing 120, bores 128 and 129 are provided with central axes 131 and/or 132 of the bores being parallel to one another and also parallel to drive axis 57. Pivot bearing 120 is mounted and fastened by pivot bearing axis 134 that passes through bore 128. The axis 134 is fastened endwise by screws 136 and interposed spacer washers 137 to mounting arms 138 shown in FIG. 2. In addition, pivot bearing 120 is fastened to bearing part 96 in the mounted state by means of bearing pin 117 and is thus secured. Bearing pin 117 extends through bore 129 that passes through pivot bearing legs 121.1 and 121.2, and also extends through bore 114 of mounting legs 105.1 and 105.2 of bearing part 96, as well as through spacing bushing 139 located between the mounting legs.

Figure 7:
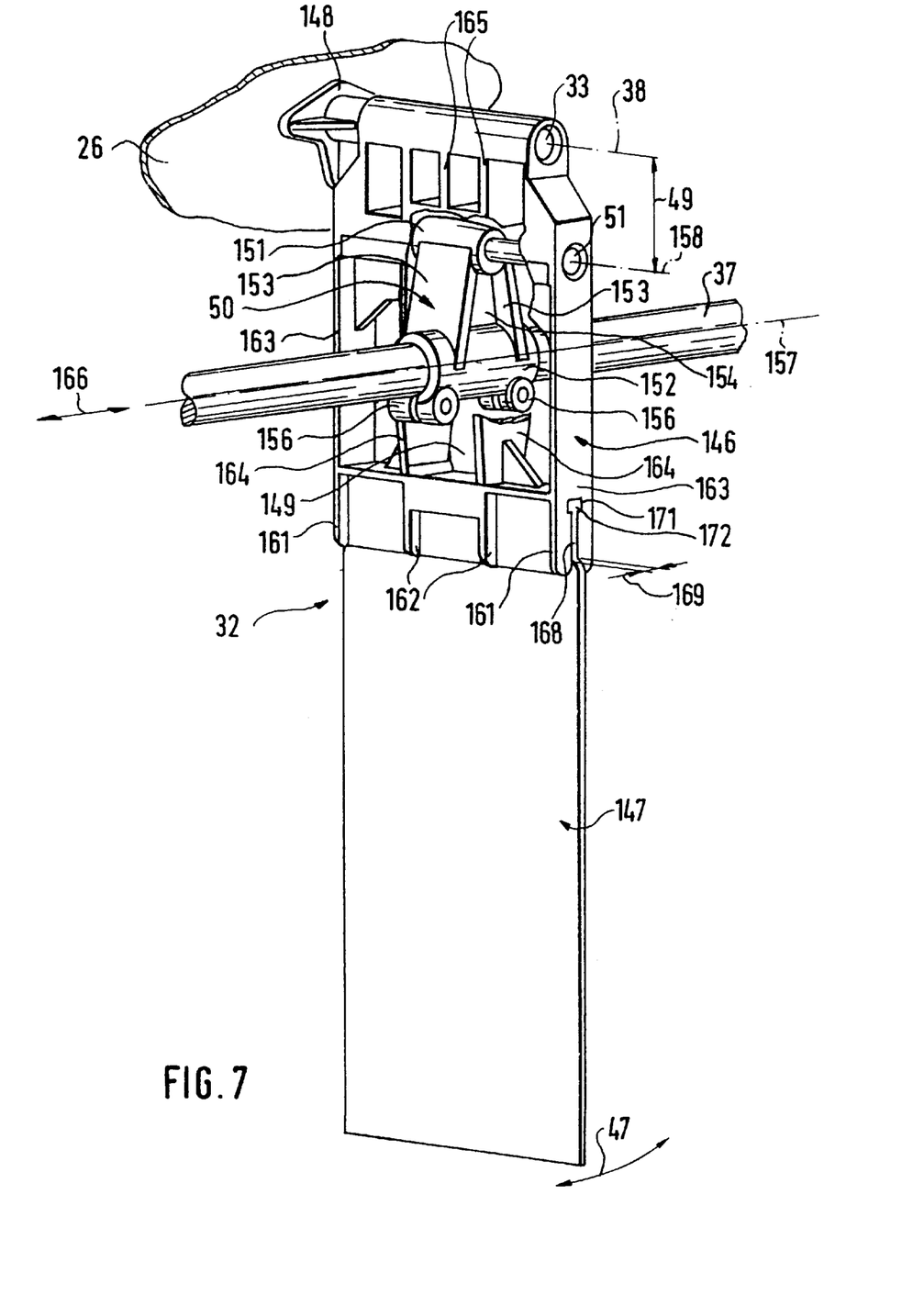
FIG. 7 is a diagonal view with a partial section of a fan flap.

The design and mounting of fan flap 32 is shown in FIG. 7. Fan flap 32 has an upper force-transmitting part 146 and a lower fan part 147. Fan flap 32 is made from materials that can withstand the mechanical, chemical, and climatic conditions in cage assemblies, with upper force-transmitting part 146 being made from a relatively rigid plastic, especially fiberglass-reinforced polyamide 6.6 and lower fan part 147 being made from a relatively flexible material but one that is characterized by sufficient intrinsic rigidity, especially a thermoplastic elastomer (TPE) or cross-linked polyolefin. To mount fan flap 32, the latter has transverse axis 33 at the upper end of force-transmitting part 146. The axis 33 extends in the transverse direction of fan flap 32 and parallel to drive axis 57. This transverse axis, as shown in FIG. 7, is connected at one end with mounting part 148. The mounting part 148 is fastened to longitudinal wall 26 but is also capable of being fastened at both ends to longitudinal walls 25 and 26. Force-transmitting part 146 has a through opening 149 extending in the longitudinal direction of fan flap 32 to allow push rods and pull rods 37 to pass through and to receive connecting member 50 that wraps predominantly around push rods and pull rods 37 as well as fan drive axis 51. As a result, first a positive secure connection is achieved between connecting member 50 and push and pull rods 37 and between connecting member 50 and fan drive axis 51, and second, simple assembly and disassembly are possible.

To prevent fan drive axis 51 from inadvertently coming loose, each fan flap 32 is designed with safety elements. The safety elements are provided in the vicinity of the extreme ends of fan drive axis 51. Advantageously, the safety elements overlap the extreme ends of fan drive axis 51 with a degree of flexibility such that the shaft can be pushed in or out laterally for assembly or disassembly.

Connecting member 50 is formed by upper sleeve-shaped mounting part 151, lower sleeve-shaped mounting part 152, and cross ribs 153 located in between and permanently connected with mounting parts 151 and 152, as well as lengthwise rib 154. Connecting member 50 is connected with force-transmitting part 146 by fan drive axis 51. The axis 51 is rotatably movable mounted in the part and runs parallel to transverse axis 33 at a short distance beneath the axis, with corresponding rotational axes 158 and 38 having a distance 49 between them. Lower mounting part 152 of connecting member 50 is formed by a slotted sleeve provided with mounting bushing 156. The slotted sleeve wraps most of the way around pull rods and push rods 37 extending through them. Pull rods and push rods 37 are fastened to connecting member 50 in such fashion that the screws that pass through mounting bushings 156 but are not shown in FIG. 7 are tightened until the lower mounting part is connected, clamped firmly, with pull rod or push rod 37, but can be released again.

In the assembled state, push rods and pull rods 37 run below fan drive axis 51, with central lengthwise axis 157 of push rods and pull rods 37 and rotational axis 158 of drive axis 51 having a distance or spacing 46 (FIG. 3) between them and running perpendicular to one another.

To pivot fan flap 32 with the aid of drive means 55, a reciprocating movement of pull rods and push rods 37 is achieved, as indicated by double arrow 166. The reciprocating movement is transmitted through connecting member 50 to fan drive axis 51 and results in the reciprocating movement of fan flap 32 around transverse axis 33 as indicated by double arrow 47. To reduce the oscillating weight, at least force-transmitting part 146 has suitable openings and/or holes in the material. To reinforce force-transmitting part 146, reinforcing lengthwise ribs 161 to 165 are provided at suitable locations. The ribs 161 to 165 extend primarily in the lengthwise direction of fan flap 32.

Advantageously, force-transmitting part 146 and fan part 147 are designed to be separable from one another. As a result, fan part 147 can be removed or replaced easily and can be adjusted optimally in terms of its length and/or its material or vibration characteristics, even with extensive retention of all other movable parts of the system. For this purpose, force-transmitting part 146 has a gap 168 at its lower end. The gap 168 in the plane of the fans, and the width 169 of the gap corresponds to the thickness of fan part 147 in this area, at least in the vicinity of the opening edges of the gap side. An opening 171 that can be widened is provided at the end of gap 168 that faces the fan drive axis. The opening 171 corresponds to a matching thickening and/or material accumulation 172 at the upper end of fan part 147. For assembly, fan part 147 is pushed laterally into gap 168 of force-transmitting part 146. For locking gap 168 has at least one depression that extends primarily at right angles to the fan surface (not shown in FIG. 7). The depression corresponds to an elevation in fan part 147 (likewise not shown in FIG. 7), so that during assembly of the two parts, the elevation locks positively and releasably in the depression. To reduce the oscillating weight and to achieve optimum fanning effects, the wall thickness of the fan part decreases from top to bottom.

The operational and movement cycle and the cooperation of the individual functional parts of the cage battery are described below:

Drive shaft 63 is set rotating by drive motor 65. Eccentric element 62 permanently attached to drive shaft 63, together with the two cam plates 58, 59 arranged staggered 180° apart rotates together with drive shaft 63. The eccentric rotational movement of cam plates 58 and 59 is transmitted in the form of an oscillating rotational movement in a plane that is perpendicular to drive axis 57 to connecting rod head 81, fastened to ball bearings 64 of connecting rods 77 located on both sides of drive means 55. For horizontal angle adjustment an angle-adjusting element 80 is provided between connecting rod head 81 and connecting rod shaft 79 of connecting rod 77. The angle adjusting element 80 is formed in this case by damping members 85.1 and 85.2. The members 85.1 and 85.2 transmit the tensile and compressive forces from eccentric element 62 to connecting rod shafts 79 of connecting rod 77, and produce a first decoupling and damping. Between connecting rod fork 78 located at the end of connecting rod shaft 79 that is directed away from drive means 55 and pull rods and push rods 37, bearing and adjusting element 95 is movably mounted by means of articulation screw 109 to rotate around rotational axis 116 that is parallel to drive axis 57, with bearing and adjusting element 95 being permanently attached to push rod or pull rod 37 at its end that is directed toward drive means 55. As a result, vertical angular adjustment between connecting rod shaft 79 of connecting rod 77 and push rods and pull rods 37 is possible, so that the oscillating rotational movement of connecting rod 77 is converted to pushing or pulling translational movement of pull rods and push rods 37. Damping member 97 located in bearing part 96 of bearing and adjusting element 95 produces further decoupling and damping during transmission of tensile and compressive forces from connecting rod 77 to push rods and pull rods 37.

In order to accept the relatively high force peaks and/or lateral forces in the vicinity of bearing and adjusting element 95, pivot bearing 120 is located between this element and mounting arms 138 that are fixed relative to drive axis 57. The bearing 120 oscillates around central axis 131 that is parallel to drive axis 57.

The pulling and pushing translational reciprocating movement of pull rods and push rods 37 is transmitted through connecting members 50 between pull rods and push rods 37 and fan drive axis 51 to fan flap 32. Inasmuch as fan flap 32 is mounted at its upper end on transverse axis 33 that is relatively fixed with regard to drive axis 57 and in conjunction with connecting member 50 that is parallel to fan drive axis 51 and is movably mounted to rotate around rotational axis 158, fan flap 32 performs a forcibly controlled reciprocating movement in the direction of arrow 47.

As a result of the special design, construction, and arrangement of connecting member 50 between pull rods and push rods 37 and fan drive axis 51, a local bending moment is produced in these rods in the vicinity of each connecting member 50 during the translational reciprocating movement of pull rods and push rods 37. The local bending moment, also in conjunction with phase-offset differential lengthening of pull rods and push rods 37 and in combination with the inertial forces acting in the opposite direction owing to pull rods and push rods 37 being mounted jointly on both sides of drive means 55, produces decoupling and/or damping and hence suppression of undesired vibrations.

As shown in FIG. 1, fan flaps 32 in upper cage row 11.4 as well as in cage row 11.2 are in a stage of their motion phase such that they occupy the position shown just before they reach maximum deflection. The deflection position of fan flap 32 located to the left of drive means 55 is exactly opposite to the deflection of fan flap 32 located to the right of drive means 55. In the position shown, lower fan parts 147 of fan flaps 32 located in the upper cage row 11.4 to the left and right of drive means 55 swing toward one another, while corresponding lower fan part 147 in cage row 11.2 swing away from one another. As is also shown in FIG. 1, the oscillation phase of the fan flaps in upper cage row 11.4 is phase-offset by exactly 180° with respect to the fan flaps in cage row 11.2. The fan flaps of cage row 11.3 and of lower cage row 11.1 are in the central suspended position. This motion phase of fan flaps 32 is also shown in FIG. 2 and corresponds to the position of cam plates 58 and 59 shown in FIGS. 4 and 5.

As shown in FIG. 1, in each of the double cage rows 11, pull rods and push rods 37 located to the left and right of drive means 55 and hence fan flaps 32 are phase-offset by 180° and jointly driven by a drive means 55 with a drive motor 65. As a result, the inertial forces acting in opposite directions always compensate one another, so that due to the relatively slow operating speed of drive motor 65, fan flaps 32 reciprocate in such fashion that the inertial forces largely cancel one another out. In combination with connecting members 50 located between pull rods and push rods 37 and fan drive axis 51, and the members being rotatable around the fan drive axis, there is no longer any irregular operation and thus the entire cage currently remains in a relatively quiet state. Despite the use of pull rods and push rods 37 that are often many meters long, very good working results can be achieved that result in good drying of the dung with a low energy consumption.

An important part of the invention is that the cage currently has air flow devices (23) with pivotally suspended fan flaps (32), with pull rods and push rods (37) driven in a reciprocating fashion groupwise, with the drive means driving pull rods and push rods (37) engaging them commonly on both sides.

A cage assembly (10) in accordance with the invention has air flow devices (23) with pivotally suspended fan flaps (32) with pull rods and push rods (37) driven in reciprocating fashion groupwise, with the drive means driving pull rods and push rods (37) engaging them commonly on both sides.

A list of references numerals of the drawings is as follows:

| | |
|---|---|
| 10 | Cage assembly |
| 11.1 | Cage row |
| 11.2 | Cage row |
| 11.3 | Cage row |

-continued

| | |
|---|---|
| 11.4 | Cage row |
| 12.1 | Cage housing |
| 12.2 | Cage housing |
| 12.3 | Cage housing |
| 12.4 | Cage housing |
| 13 | Cage |
| 14 | Back |
| 15 | Front |
| 16 | Grid floor |
| 17 | Egg-collecting groove |
| 18 | Feed trough |
| 19 | Foot |
| 20 | Dung belt |
| 20.1 | Loose side of belt |
| 21 | Edge limit |
| 22 | Dung |
| 23 | Air flow device |
| 24 | Lengthwise central plane |
| 25 | Lengthwise wall |
| 26 | Lengthwise wall |
| 27 | Upper edge strip |
| 28 | Lower edge strip |
| 29 | Channel |
| 30 | Chamber |
| 31 | Transverse wall |
| 32 | Fan flap |
| 32.1 | Fan flap |
| 32.2 | Fan flap |
| 33 | Transverse axis |
| 34 | Strip |
| 35 | Lengthwise tube |
| 36 | Air flow divider |
| 37 | Pull rods and push rods |
| 37.1 | Pull rods and push rods |
| 37.2 | Pull rods and push rods |
| 37.3 | Pull rods and push rods |
| 37.4 | Pull rods and push rods |
| 38 | Rotational axis of 33 |
| 45 | pivot drive |
| 46 | Space |
| 47 | Double arrow |
| 48 | Air outlet opening |
| 49 | Space |
| 50 | Connecting member |
| 51 | Drive axis |
| 55 | Drive means |
| 57 | Drive axis |
| 58 | Cam plate |
| 59 | Cam plate |
| 60 | Eccentric axis |
| 61 | Eccentric axis |
| 62 | Eccentric element |
| 63 | Drive shaft |
| 64 | Ball bearing |
| 65 | Drive motor |
| 66 | Shoulder |
| 69 | Shaft retaining ring |
| 70 | Shaft retaining ring |
| 71 | Bore |
| 72 | Groove |
| 73 | Wedge and/or feather key |
| 76 | Ring of connecting rod head |
| 77 | Connecting rod |
| 78 | Connecting rod fork |
| 78.1 | Fork leg |
| 78.2 | Fork leg |
| 79 | Connecting rod shaft |
| 80 | Angular adjusting element |
| 81 | Connecting rod head |
| 83 | Bearing bushing |
| 84.1 | Articulation bushing |
| 84.2 | Articulation bushing |
| 85.1 | Damping member |
| 85.2 | Damping member |
| 86 | Bearing pin |
| 87 | Articulation axis |
| 89 | End of 76 |
| 91.1 | Articulation strip |
| 91.2 | Articulation strip |
| 92 | Lengthwise axis of 79 |

-continued

| | |
|---|---|
| 93 | Bore |
| 94 | Axis |
| 95 | Bearing and adjusting element |
| 96 | Bearing part |
| 97 | Damping member |
| 98 | Rubber and/or plastic sleeve |
| 99.1 | Metal jacket |
| 99.2 | Metal jacket |
| 105.1 | Mounting leg |
| 105.2 | Mounting leg |
| 106 | Pivot bushing |
| 108 | Spacing washer |
| 109 | Articulation screw |
| 111 | Bore |
| 112 | Hexagonal nut |
| 114 | Bore |
| 116 | Rotational axis |
| 117 | Bearing pin |
| 120 | Pivot bearing |
| 121.1 | Pivot bearing leg |
| 121.2 | Pivot bearing leg |
| 122 | Gap |
| 123.1 | End Face |
| 123.2 | End Face |
| 124 | Gap width |
| 125 | Space |
| 126.1 | Lateral surface of 105.1 |
| 126.2 | Lateral surface of 105.2 |
| 128 | Bore |
| 129 | Bore |
| 131 | Central axis of 128 |
| 132 | Central axis of 129 |
| 134 | Pivot bearing axis |
| 136 | Screw |
| 137 | Spacing washer |
| 138 | Mounting arm |
| 139 | Spacing bushing |
| 146 | Upper force-transmitting part |
| 147 | Lower fan part |
| 148 | Mounting part |
| 149 | Through opening |
| 151 | Upper mounting part |
| 152 | Lower mounting part |
| 153 | Cross rib |
| 154 | Lengthwise rib |
| 156 | Mounting bushing |
| 157 | Lengthwise axis of 37 |
| 158 | Rotational axis of 51 |
| 161 | Lengthwise rib |
| 162 | Lengthwise rib |
| 163 | Lengthwise rib |
| 164 | Lengthwise rib |
| 165 | Lengthwise rib |
| 166 | Double arrow |
| 168 | Gap |
| 169 | Gap width |
| 171 | Opening |
| 172 | Thickening or accumulation of material |

While the invention has been described in terms of its preferred embodiments, it should be understood that numerous modifications may be made thereto without departing from the spirit and scope of the invention. It is intended that all such modifications fall within the scope of the appended claims.

What is claimed is:

1. A cage assembly comprising:
   at least two horizontal cage rows formed by cage housings located adjacent to one another;
   a majority of the cage housings being formed by double cages;
   a dung receiver extending under each of the cage rows;
   fan flaps provided to dry collected dung, the fan flaps being distributed above the dung receiver at longitudinal intervals along the dung receiver and being mounted on transverse axes;
   pivot drives associated with the fan flaps to pivot the fan flaps;
   said pivot drives having pull and push rods extending longitudinally along the dung receiver through the cage assembly at a distance from the transverse axes of fan flaps and engaging the fan flaps;
   drive means for driving the pull and push rods with respect to one another in a reciprocating fashion and together;
   fan drive axes which have axes of rotation extending parallel the transverse axes of the fan flaps;
   the pull and push rods being articulated to fan flaps by means of the fan drive axes;
   proximate each pivot drive a through opening for a pull and push rod is provided;
   said drive means driving the pull and push rods which engage two sides of the drive means;
   a connecting member provided between the pull and push rods and each fan drive axis and the connecting member being rotatable around the axis of rotation of the fan drive axis.

2. A cage assembly according to claim 1 wherein the drive means is provided proximate to a longitudinal center of a cage row at least partially inside a cage housing.

3. A cage assembly according to claim 1 wherein a pivot bearing is provided between the drive means and a fan flap adjacent the pivot bearing for receiving force peaks or lateral forces.

4. A cage assembly according to claim 1 wherein the drive means has two separated side by side cam plates each having an eccentric axis and being mounted on a common drive axis and having two eccentric axes and the common drive axis in a common plane.

5. A cage assembly according to claim 1 wherein an articulation element is provided between each pull and push rod and the drive means, the articulation element having at least one damping element made of rubber and/or plastic.

6. A cage assembly according to claim 5, wherein the articulation element has at least one angle adjusting element for horizontal angle adjustment.

7. A cage assembly according to claim 5 wherein a bearing and equalizing element is provided between the articulation element and a pull and push rod, the being and equalizing element having at least one damping element made of rubber and/or plastic.

8. A cage assembly comprising:
   at least two horizontal cage rows formed by adjacent cage housings;
   a majority of the cage housings being formed by double cages;
   at least one dung receiver extending under the cage rows;
   fan flaps provided for drying collected dung, the fan flaps being distributed at longitudinal intervals along the dung receiver and above the dung receiver and mounted on transverse axes;
   pivot drives associated with the fan flaps to pivot the fan flaps;
   the pivot drives having pull and push rods extending in the longitudinal direction along the dung receiver through the cage assembly at a distance from the transverse axes of the fan flaps and engaging the fan flaps;
   the fan flaps having a force-transmitting part and a fan part; and
   at least the force transmitting part has zones of less material relative to adjacent zones to reduce oscillating weight.

9. A cage assembly according to claim 8 wherein reinforcing longitudinal ribs are provided in the force-transmitting part, the longitudinal ribs extending in a longitudinal direction of the fan flaps.

10. A cage assembly according to claim 8 wherein the force transmitting part and the fan part are made from two different materials.

11. A cage assembly according to claim 10 wherein the force-transmitting part is made of a rigid plastic.

12. A cage assembly in accordance with claim 11 wherein the rigid plastic contains polyamide reinforced with fiberglass.

13. A cage assembly according to claim 10 wherein the fan part is made of a flexible plastic.

14. A case assembly according to claim 13 wherein the flexible plastic is an elastomeric thermoplastic.

15. A cage assembly comprising:
   at least two horizontal cage rows formed by adjacent cage housings;
   a majority of the cage housings being formed by double cages;
   at least one dung receiver extending under the cage rows;
   fan flaps provided for drying collected dung, the fan flaps being distributed at longitudinal intervals along the dung receiver and along the dung receiver and above the dung receiver and mounted on transverse axes pivot drives associated with the fan flaps to pivot the fan flaps;
   the pivot drives having pull and push rods extending through the cage assembly at a distance from the transverse axes of the fan flaps and engaging the fan flaps; and
   the fan flaps having a force-transmitting part and a fan part, which are designed to be separable from one another.

16. A cage assembly according to claim 15 wherein the fan part has a wall thickness which decreases from top to bottom.

17. A cage assembly according to claim 15 wherein the force transmitting part and the fan part are made from two different materials.

18. A cage assembly according to claim 15 wherein the force transmitting part has a gap at its lower end.

19. A cage assembly according to claim 18 wherein an opening is provided at the end of the gap that faces the fan drive axis, the opening corresponding to a matching thickening and/or material accumulation at the upper end of the fan part.

20. A cage assembly according to claim 18 wherein the gap corresponds to the thickness of fan part in this area, at least in the vicinity of the opening edges of the gap side.

* * * * *

UNITED STATES PATENT AND TRADEMARK OFFICE
CERTIFICATE OF CORRECTION

PATENT NO.   : 5,901,665
DATED        : May 11, 1999
INVENTOR(S)  : Lackner

It is certified that error appears in the above-identified patent and that said Letters Patent is hereby corrected as shown below:

Title page,
Item [45], change "April 27, 1999" to -- May 11, 1999 --

Drawings,
Sheet 1 of 5 through sheet 5 of 5, first line of each sheet, change "April 27, 1999" to -- May 11, 1999 --.

Signed and Sealed this

Twenty-first Day of January, 2003

JAMES E. ROGAN
*Director of the United States Patent and Trademark Office*